United States Patent [19]

Mizutani et al.

[11] Patent Number: 4,677,461
[45] Date of Patent: Jun. 30, 1987

[54] CONTOUR DETECTING FILTER

[75] Inventors: Yoshiki Mizutani; Hiroshi Ito, both of Nagaokakyo, Japan

[73] Assignee: Mitsubishi Denki Kabushiki Kaisha, Tokyo, Japan

[21] Appl. No.: 756,227

[22] Filed: Jul. 18, 1985

[30] Foreign Application Priority Data

Jul. 26, 1984 [JP] Japan .................. 59-158007
Jul. 26, 1984 [JP] Japan .................. 59-158008
Jul. 26, 1984 [JP] Japan .................. 59-158009
Jan. 24, 1985 [JP] Japan .................. 60-12020

[51] Int. Cl.⁴ .............................. H04N 5/14
[52] U.S. Cl. .................... 358/37; 358/166; 358/96
[58] Field of Search ............. 358/21 R, 96, 37, 105, 358/36, 166, 138

[56] References Cited

U.S. PATENT DOCUMENTS 4,030,121  6/1977  Faroudja ................ 358/37
4,127,873 11/1978  Katagi .................. 358/138 X
4,331,971  5/1982  Bretl ................... 358/37
4,504,853  3/1985  Faroudja ................ 358/37
4,609,938  9/1986  Suzuki ................. 358/21 R X

OTHER PUBLICATIONS

"Image and its Processing; Digital Image Processing (III)", by Mikio Takagi, Journal of Japan Television Society, No. 12, vol. 29 (1975), pp. 1009-1019.
"Digital and Analog Enhancement Techniques" by Yves Faroudja et al., SMPTE Journal, vol. 87, Jan. 1978.
"Digital Picture Processing", by Azriel Rosenteld and Avinash C. Kak, vol. 1, Academic Press Inc., 1982, pp. 237-250.

Primary Examiner—James J. Groody
Assistant Examiner—Victor R. Kostak
Attorney, Agent, or Firm—Lowe Price LeBlanc Becker & Shur

[57] ABSTRACT

A contour detecting filter (8, 10, 11) sequentially inputs series of sampling values obtained by sampling composite video signals, which are composed of frequency-multiplexed video luminance signals and chrominance signals and include chrominance subcarriers, at a frequency four times that of the chrominance subcarriers to detect four sampling values point-symmetrically positioned around a reference sampling value and having the same-phased chrominance subcarriers by utilizing delay circuits. The reference sampling value and the four sampling values are so employed as to perform arithmetic on second order differentiations in the direction of horizontal scanning lines and the vertical direction on the screen thereby to detect the contour signal of the reference sampling value. A contour detecting filter (12) detects contour signals in the direction of horizontal scanning lines from composite video signals utilizing a vertical low-pass filter (14) and a horizontal high-pass filter (15) which are cascade-connected with each other while detecting contour signals in the vertical direction on the screen by utilizing a vertical high-pass filter (16) and a horizontal low-pass filter (17) which are cascade-connected with each other. Switched and outputted are the contour signals in the direction of the horizontal scanning lines and the vertical direction on the screen.

24 Claims, 9 Drawing Figures

8 CONTOUR DETECTING FILTER

6 VERTICAL CONTOUR DETECTING FILTER

CONTOUR DETECTING FILTER

BACKGROUND OF THE INVENTION

1. Field of the Invention

The present invention relates to a contour signal detecting filter for digitally detecting contour signals from composite video signals including frequency-multiplexed luminance signals and chrominance signals.

2. Description of the Prior Art

Various systems have been proposed in the art for detecting contour signals from video data. In television receivers, for example, horizontal and vertical contour signals are detected from luminance signals in order to add the detected horizontal and vertical contour signals to the original luminance signals thereby to improve sharpness of pictorial images. Detailed description is now made on such technique.

A composite video signal S(t) of the NTSC color television system is composed of a luminance signal Y(t) and a chrominance signal C(t) which is obtained by quadrature phase modulation of two color difference signals U(t) and V(t) at the chrominance subcarrier frequency $f_{sc}$ (3.579545 MHz). Namely, the composite video signal S(t) is expressed as follows:

$$S(t) = Y(t) + C(t) = Y(t) + U(t) \sin 2\pi f_{sc} t + V(t) \cos 2\pi f_{sc} t$$

In such a conventional contour detecting filter of the analog or digital type, for example, the luminance signal Y(t) has generally been separated from the composite video signal S(t) so as to obtain from the separated luminance signal Y(t) a horizontal contour signal through a horizontal contour detecting filter and a vertical contour signal through a vertical contour detecting filter.

FIG. 1 is a block diagram showing the circuit arrangement of a conventional horizontal contour detecting filter of the digital system. In FIG. 1, a horizontal contour detecting filter 5 is provided as external circuits with an analog-to-digital conversion circuit (hereinafter referred to as A-D conversion circuit) 2 for sampling analog composite video signals which are supplied to an input terminal 1 at a predetermined sampling frequency $f_s$ thereby to convert the same into digital composite video signals and a chrominance/luminance signal separation circuit (hereinafter referred to as Y/C separation circuit) 3 for separating and detecting luminance signals from the digital composite video signals A-D converted through the A-D conversion circuit 2. The horizontal contour detecting filter 5 is formed by a delay circuit 50-1 which receives the digital signals from the Y/C separation circuit 3 to delay the same by the reciprocal of the sampling frequency $f_s$, i.e., the sampling period T for the digital signals, a delay circuit 50-2 which receives the delayed digital luminance signals from the delay circuit 50-1 to delay the same by the sampling period T, a coefficient multiplier 51 which multiplies the signals received from the delay circuit 50-1 by −2 to output the same and an adder 52 which receives the signals from the Y/C separation circuit 3, delay circuit 50-2 and coefficient multiplier 51 to add up the same and outputs the result. Description is now made on the operation for detecting the horizontal contour signals.

The analog video signals supplied to the input terminal 1 are sampled by the A-D conversion circuit 2 at the predetermined sampling frequency $f_s$ to be converted into digital composite video signals, from which only luminance signal components are supplied to the horizontal contour detecting filter 5 through the Y/C separation circuit 3. It is assumed here that a luminance signal f(t) outputted from the Y/C separation circuit 3 is supplied as f(nT) at a time t=nT, while the output luminance signal from the delay circuit 50-1 of the delay time T is supplied as f((n−1)T). The delay circuit 50-2 delays the luminance signal f((n−1)T) delayed by the delay circuit 50-1 further by the period T, and hence the output signal from the delay circuit 50-2 is f((n−2)T). The coefficient multiplier 51 multiplies the output signal from the delay circuit 50-1 by −2, and hence the output signal from the coefficient multiplier 51 is −2f((n−1)T). The adder 52 adds up all of its input signals to output the result, and hence the luminance signal supplied to an output terminal 4 of the horizontal contour detecting filter 5 is:

$$f(nT) - 2f((n-1)T) + f((n-2)T)$$

This is expressive of the second order differentiation with respect to the horizontal direction (horizontal frequency component) of the luminance signal f(t) on the screen. Thus, detected is the horizontal high-frequency component of the luminance signal, i.e., the horizontal contour signal.

FIG. 2 is a block diagram showing the structure of a conventional vertical contour detecting filter of the digital system. Similarly to those of the horizontal contour detecting filter 5 as shown in FIG. 1, provided as external circuits of a vertical contour detecting filter 6 are an A-D conversion circuit 2 for A-D converting analog video signals supplied to an input terminal 1 and a Y/C separation circuit 3 which receives the signals from the A-D conversion circuit 2 to output only luminance signal components. The vertical contour detecting filter 6 is formed by a delay circuit 60-1 which receives the luminance signals from the Y/C separation circuit 3 to delay the same by one horizontal scanning interval (hereinafter referred to as 1H), a delay circuit 60-2 which receives the signals from the delay circuit 60-1 to delay the same by 1H, a coefficient multiplier 61 which receives the signals from the delay circuit 60-1 to multiply the same by −2 and an adder 62 which receives the signals from the Y/C separation circuit 3, delay circuit 60-2 and coefficient multiplier 61 to add up the same. The operation of the vertical contour detecting filter 6 is now described.

The vertical contour detecting filter 6 as shown in FIG. 2 is different in structure from the horizontal contour detecting filter 5 of FIG. 1 only in delay times of the delay circuits. Therefore, assuming that a luminance signal f(nT) at a time t=nT is supplied to the vertical contour detecting filter 6 from the Y/C separation circuit 3, the output signal of the vertical contour detecting filter 6 is, similarly to the case of the horizontal contour detecting filter 5, as follows:

$$f(nT) - 2f(nT-H) + f(nT-2H)$$

This is expressive of the second order differentiation in the vertical direction (vertical frequency component) on the screen. Namely, detected is the vertical high frequency component of the luminance signal, i.e., the contour signal in the vertical direction on the screen.

FIG. 3 is a block diagram showing the structure of a conventional horizontal/vertical contour detecting filter of the digital system formed by combining the horizontal contour detecting filter as shown in FIG. 1 with the vertical contour detecting filter as shown in FIG. 2.

The structure as shown in FIG. 3 is obtained by combining the horizontal contour detecting filter 5 of FIG. 1 and the vertical contour detecting filter 6 of FIG. 2, with only difference in delay times of delay circuits 70-1 and 70-4 and the value of the coefficient in a coefficient multiplier 71, in order to adjust the delay times. In other words, connected in series are a delay circuit 70-1 of a delay time (hereinafter referred to as (H−T))obtained by subtracting one sampling period from one horizontal scanning interval, a delay circuit 70-2 of the delay time T, a delay circuit 70-3 of the delay time T and a delay circuit 70-4 of the delay time (H−T) in the said order. A contour detecting filter 7 includes the coefficient multiplier 71 which receives the signals from the delay circuit 70-2 to multiply the same by −4 and an adder 72 which receives the signals from the Y/C separation circuit 3, delay circuit 70-1, coefficient multiplier 71 and delay circuits 70-3 and 70-4 to add up the same. In other words, the horizontal/vertical contour detecting filter 7 is implemented by matching a vertical contour detecting filter formed by the delay circuits 70-1 to 70-4, coefficient multiplier 71 and adder 72 and a horizontal contour detecting filter formed by the delay circuits 70-2 and 70-3, coefficient multiplier 71 and adder 72. Thus, horizontal and vertical contour signals can be simultaneously detected by the horizontal/vertical contour detecting filter 7. The horizontal/vertical contour detecting filter 7 in such structure can be considered to perform arithmetic on the second order differentiation in the oblique direction on the screen, whereby oblique contour signals can also be detected.

FIG. 4 is a block diagram showing definite structure of the Y/C separation circuit 3 as shown in FIGS. 1 to 3. As obvious from FIG. 4, the Y/C separation circuit 3 is formed by a line memory 30 which receives the signals from the A-D conversion circuit 2 to delay the same by predetermined periods thereby to supply three types of signals to a vertical high-pass filter 31 while supplying single-type delay signals to a delay circuit 33, a vertical high-pass filter 31 which receives the signals having three types of delay times from the line memory 30 to detect high frequency components in the vertical direction on the screen and supply the same to a horizontal high-pass filter 32, which in turn detects high frequency components in the direction of horizontal scanning lines from the signals received from the vertical high-pass filter 31 thereby to separate chrominance signals and supply the same to one input terminal of a subtractor 34, and the delay circuit 33 which receives the delay signals from the line memory 30 to delay the same by a period 2T, i.e., twice the sampling period T, and to supply the signals to the other input terminal of the subtractor 34, which in turn subtracts the signals of the horizontal high-pass filter 32 from those of the delay circuit 33 to supply the result to a contour detecting filter in the following stage.

The line memory 30 is formed by cascade-connected delay circuits 30-1 and 30-2 for delaying supplied signals by one horizontal scanning interval H and outputting the same, and is adapted to receive the signals from the A-D conversion circuit 2 to generate three types of signals including non-delayed signals, signals delayed by 1H and those delayed by 2H.

The vertical high-pass filter 31 is formed by a $-\frac{1}{4}$ multiplier 31-1 which multiplies the non-delayed signals received from the line memory 30 by $-\frac{1}{4}$ thereby to output the same, a $\frac{1}{2}$ multiplier 31-2 which multiplies the 1H-delay signals received from the line memory 30 by $\frac{1}{2}$ thereby to output the same, a $-\frac{1}{4}$ multiplier 31-3 which multiplies the 2H-delayed signals received from the line memory 30 by $-\frac{1}{4}$ thereby to output the same and an adder 31-4 which adds up the signals from the $-\frac{1}{4}$ multipliers 31-1 and 31-3 and $\frac{1}{2}$ multiplier 31-2 to supply the result to the horizontal high-pass filter 32.

The horizontal high-pass filter 32 is formed by a delay circuit 32-1 which delays the signals from the vertical high-pass filter 31 by 2T, a delay circuit 32-2 for delaying the signals from the delay circuit 32-1 further by 2T, a $-\frac{1}{4}$ multiplier 32-3 for multiplying the signals received from the vertical high-pass filter 31 by $-\frac{1}{4}$ and outputting the same, a $\frac{1}{2}$ multiplier 32-4 for multiplying the signals received from the delay circuit 32-1 by $\frac{1}{2}$ to output the same, a $-\frac{1}{4}$ multiplier 32-5 for multiplying the signals from the delay circuit 32-2 by $-\frac{1}{4}$ to output the same and an adder 32-6 for adding up the signals received from the $-\frac{1}{4}$ multipliers 32-3 and 32-5 and $\frac{1}{2}$ multiplier 32-4 to output the result.

Brief description is now made on the operation of the luminance/chrominance separation circuit.

The output signals from the A-D conversion circuit 2 are sequentially detected by the line memory 30 as three signals having the cycle of one horizontal scanning interval H. The vertical high-pass filter 31 receives the output signals from the line memory 30 to detect the high-frequency components in the vertical direction on the screen. The horizontal high-pass filter 32 cascade-connected to the vertical high-pass filter 31 detects the high-frequency components in the direction of the horizontal scanning lines to separate the chrominance signals and supply the same to the subtractor 34. On the other hand, the output signals from the first stage H delay circuit 30-1 of the line memory 30 are delayed by the delay circuit 33 by the period 2T (twice the sampling period T) to be supplied to the subtractor 34. The subtractor 34 subtracts the output signals of the horizontal high-pass filter 32 from the output signals of the delay circuit 33 thereby to obtain luminance signals, which are outputted to a contour detecting filter connected to the following stage of the Y/C separation circuit 3.

As hereinabove described, the conventional contour detecting filter detects the contour signals by utilizing only the luminance signal components. Therefore, delay circuits required for a luminance/chrominance signal separation circuit for separating composite video signals into luminance signals and chrominance signals cannot be commonly used with the delay circuits required for the horizontal/vertical contour detecting filter, whereby the cost therefor is inevitably increased.

SUMMARY OF THE INVENTION

The present invention relates to a contour detecting filter for detecting contour signals from composite video signals in which luminance signals and chrominance signals are frequency-multiplexed and are included chrominance subcarriers, and the object of the present invention is to directly detect the contour signals from the composite video signals without employing luminance signals separated from the composite video signals.

In order to attain the aforementioned object, a sampling value is inputted sequentially as a noted sampling value from series of sampling values obtained by sampling the composite video signals to be arranged in the form of a lattice in the direction of horizontal scanning lines and the vertical direction on the screen. Then detected are four sampling values point-symmetrically positioned around the noted sampling value and having the same-phased chrominance subcarriers. The noted sampling value and the other four sampling values are employed to perform arithmetic on second order differentiations in the direction of horizontal scanning lines and in the vertical direction on the screen.

In order to attain the aforementioned object, further, a vertical low-pass filter and a horizontal high-pass filter are cascade-connected to detect contour signals along the horizontal scanning lines from the composite video signals while a vertical high-pass filter and a horizontal low-pass filter are cascade-connected to detect contour signals in the vertical direction on the screen. The contour signals along the horizontal scanning lines and the vertical contour signals are switched to be outputted.

The above and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
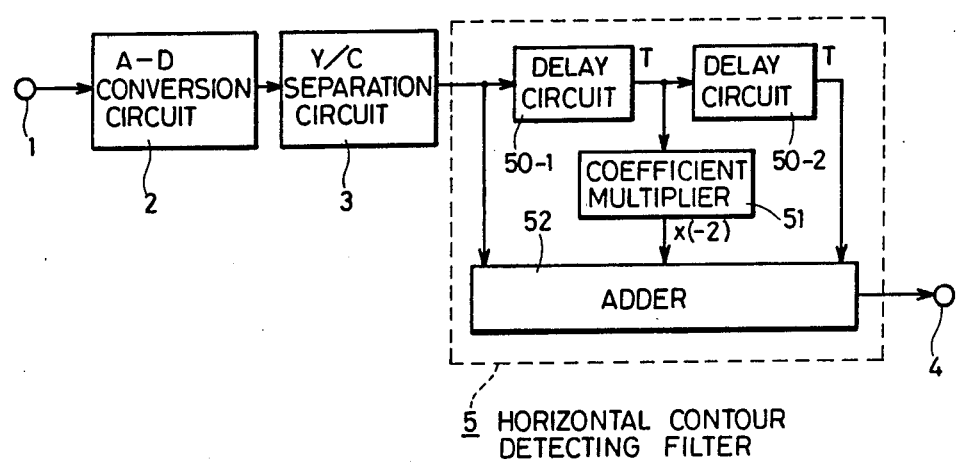
FIG. 1 is a block diagram showing structure of a conventional horizontal contour detecting filter of the digital system.
Figure 2:
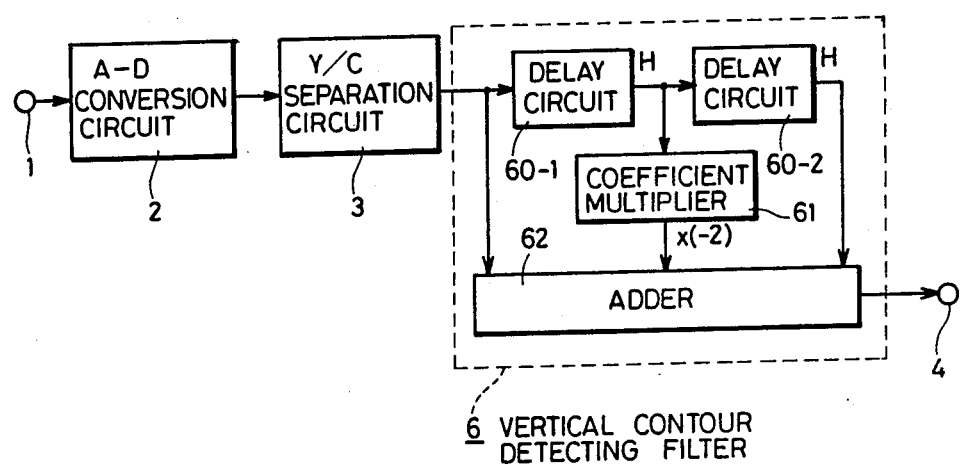
FIG. 2 is a block diagram showing structure of a conventional vertical contour detecting filter of the digital system.
Figure 3:
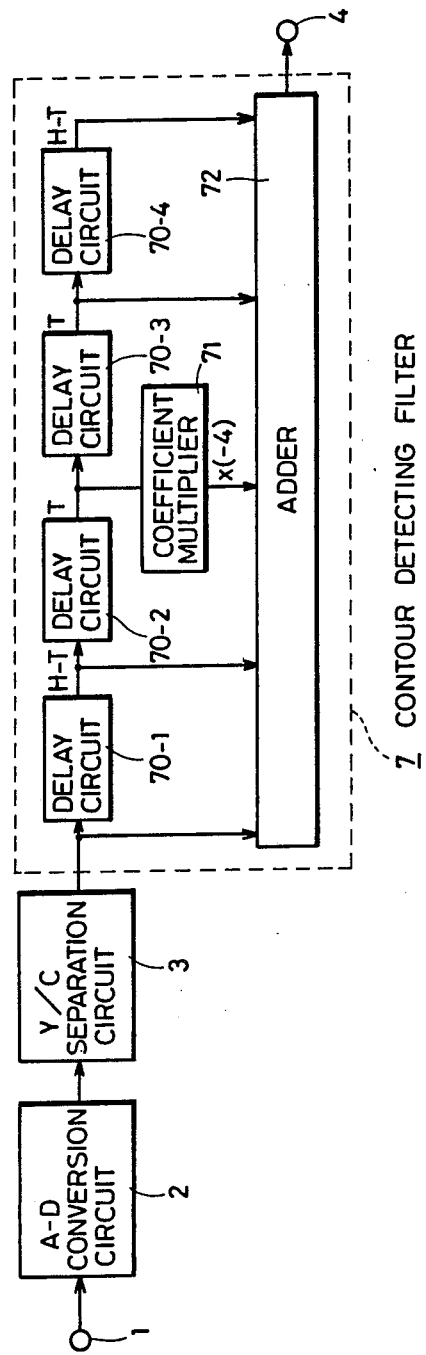
FIG. 3 is a block diagram showing structure of a conventional contour detecting filter of the digital system.
Figure 4:
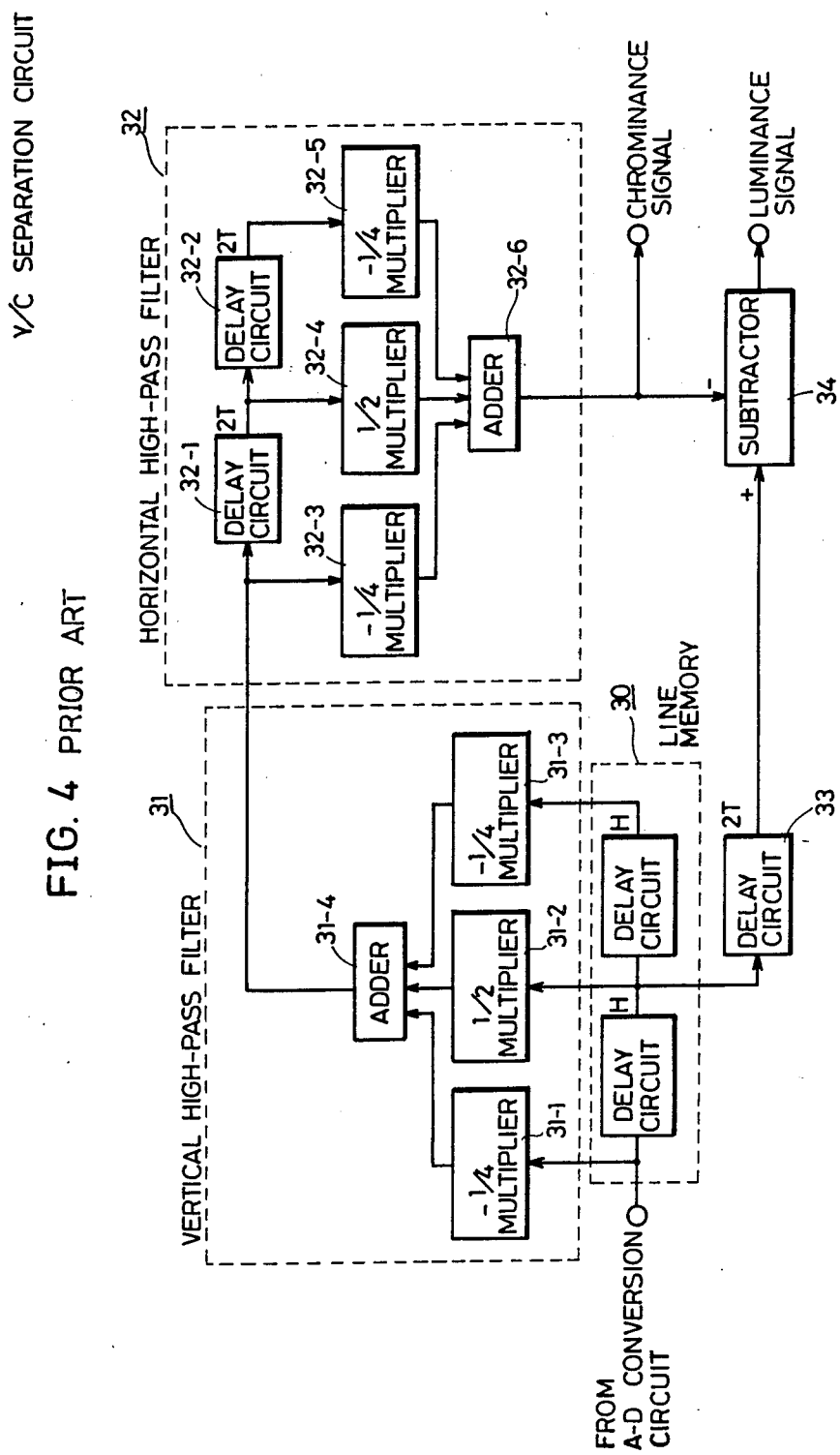
FIG. 4 is a block diagram showing structure of a Y/C separation circuit.
Figure 5:
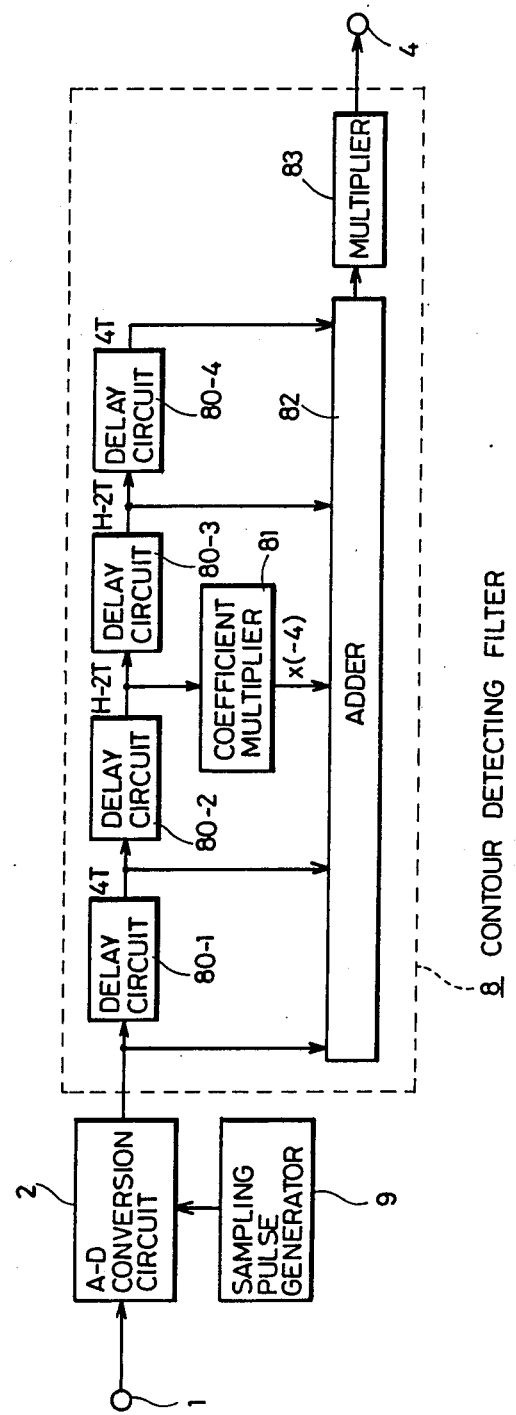
FIG. 5 is a block diagram showing structure of a contour detecting filter according to an embodiment of the present invention.

FIG. 5 is a schematic block diagram showing a contour signal detecting filter according to an embodiment of the present invention. In FIG. 5, provided as external circuits are an A-D conversion circuit 2 which converts analog composite video signals of the NTSC color television system supplied to an input terminal 1 into digital signals and a sampling pulse generator 9 which supplies timing signals (sampling pulses) for A-D conversion (sampling) in the A-D conversion circuit 2. The timing signals have a frequency four times the frequency $f_{sc}$ of the chrominance subcarriers included in the composite video signals, and are synchronized with the chrominance subcarriers. Therefore, the digital signals supplied by the A-D conversion circuit 2 are sampled per period T of the pulses generated by the sampling pulse generator 9. A contour signal detecting filter 8 is formed by a delay circuit 80-1 which delays the digital signals supplied by the A-D conversion circuit 2 by a period 4T (four times the sampling period T), a delay circuit 80-2 which receives the signals supplied by the delay circuit 80-1 to delay the same by a period (H−2T) obtained by subtracting a period twice the sampling period T from one horizontal scanning interval, a delay circuit 80-3 which receives the signals from the delay circuit 80-2 to delay the same by the period (H−2T) and a delay circuit 80-4 which receives the signals from the delay circuit 80-3 to delay the same by the period 4T, which are connected in series to each other to forx a delay system. Respective outputs from the delay circuits 80-1 to 80-4 forming the delay system are also supplied to an adder 82 which adds up all of its input signals to output the result in a direct manner except for the delay circuit 80-2, the output signals of which are supplied to the adder 82 through a coefficient multiplier 81 for multiplying its input signals by −4 to output the same. The outputs from the adder 82 are supplied to a multiplier 83 which multiplies its input signals by a real number N to output the same for contour correction adjustment. The value of this multiplier factor N is controlled by, e.g., a microcomputer (not shown) included in the external circuits. Description is now made on the operation of the contour signal detecting filter.

Figure 6:
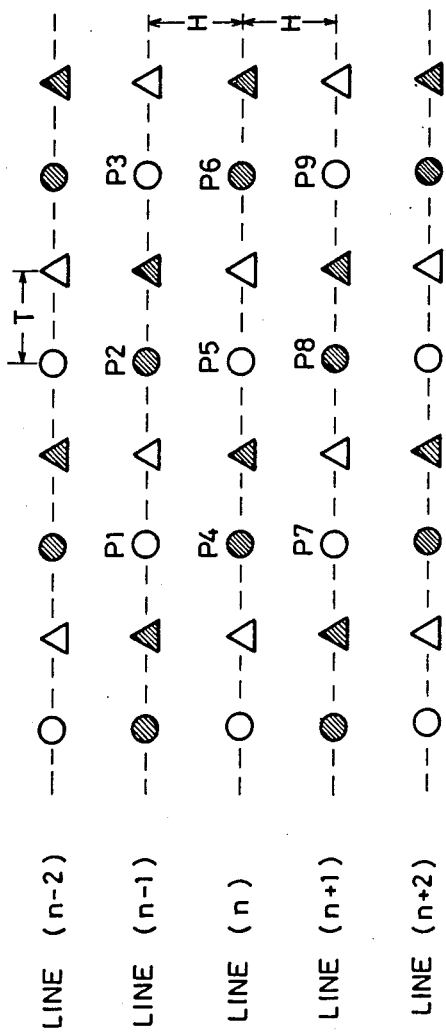
FIG. 6 is a diagram showing sampled composite video signal series.

FIG. 6 is illustrative of signal series of the NTSC system composite video signals sampled by the A-D conversion circuit 2 as shown in FIG. 5. In FIG. 6, a line n is representative of an n-th horizontal scanning line on the screen, and signals having the same symbols ○, △, ●, ▲ are representative of video signals having chrominance subcarriers of the same phases. The video signals are sampled at the frequency $f_s$ four times the chrominance subcarrier frequency $f_{sc}$, and hence the video signals having antiphase chrominance subcarriers are vertically aligned on the screen. Description is now made on the operation of the contour signal detecting filter as shown in FIG. 5 with reference to the video signals indicated by symbols P1 to P9 in FIG. 6.

It is assumed here that a video signal indicated by a code P9 (hereinafter referred to as sampling point P9— this also applies to other video signals indicated by codes P1 to P8) is supplied from the A-D conversion circuit 2 to the contour signal detecting filter 8. At this time, the 4T delay circuit 80-1 outputs a signal ahead of the sampling point P9 by the time 4T, and hence it outputs the sampling value of the sampling point P7;

the (H−2T) delay circuit 80-2 outputs a signal ahead of the sampling point P7 by the period (H−2T), and hence it outputs the sampling value of the sampling point P5;

the (H−2T) delay circuit 80-3 outputs a signal ahead of the sampling point P5 by the period (H−2T), and hence it outputs the sampling value of the sampling point P3; and the 4T delay circuit 80-4 outputs a signal ahead of the sampling point P3 by the period 4T, and hence it outputs the sampling value of the sampling point P1 respectively. The sampling value of the sampling point P5 supplied by the (H−2T) delay circuit 80-2 is multiplied by −4 through the coefficient multiplier 81 to be supplied to the adder 82, while the sampling value of the sampling point P9 supplied by the A-D conversion circuit 2 and those supplied by the other delay circuits 80-1, 80-3 and 80-4 are directly supplied to the adder 82. Thus, the adder 82 adds up all of its input signals and hence the signal supplied from the adder 82 to the multiplier 83 is:

(sampling value of sampling point P9)+(sampling value of sampling point P7)+(sampling value of sampling point P3)+(sampling value of sampling point P1)−4(sampling value of sampling point P5)

This expression can be transformed as follows:

{(sampling value of sampling point P9)−2(sampling value of sampling point P5)+(sampling value of sampling point P3}+{(sampling value of sampling point P7)−2(sampling value of sampling point P5)+(sampling value of sampling point P1)}

The above can be further transformed as follows:

{(sampling value of sampling point P1)−2(sampling value of sampling point P5)+(sampling value of sampling point P3}+{(sampling value of sampling point P7)−2(sampling value of sampling point P5)+(sampling value of sampling point P9)}

Still further transformation of the above can be made as follows:

{(sampling value of sampling point P1)−2(sampling value of sampling point P5)+(sampling value of sampling point P9}+{(sampling value of sampling point P3)−2(sampling value of sampling point P5)+(sampling value of sampling point P7)}

As obvious from FIG. 6, these are expressive of vertical, horizontal and oblique second order differentiations of the composite video signals on the screen. Since the referred sampling points occupy merely small sampling spaces, changes in chrominance signals in the sampling spaces can be disregarded in practice, whereby the sampling values of the chrominance signals are identical in the sampling points having the same chrominance subcarrier phases. Therefore, the chrominance signal components are eliminated in the above expressions, whereby the second order differentiations are performed in the vertical, horizontal and oblique directions of the luminance signals on the screen. In other words, detected are contour signals in the vertical, horizontal and oblique directions. The detected contour signals are supplied to the multiplier 83 to be multiplied by N and supplied to the output terminal 4. The value of the multiplier factor N indicates the degree of contour correction, and is controlled in a desired manner by, e.g., a microcomputer (not shown) in the exterior. Thereafter the detected contour signals are added up with the luminance signals whereby contour correction is performed.

In order to detect the luminance signals from the video signals, signals having suitable delay times are detected from a delay circuit included in the contour signal detecting filter 8 by utilizing a tap or the like to perform Y/C separation. Although the sampling pulse frequency $f_s$ is four times the chrominance subcarrier frequency $f_{sc}$ in the aforementioned embodiment, the sampling frequency is not restricted to this and may be set at any desired value provided that the sampling points are vertically aligned on the screen. In other words, the same effect as the above embodiment can be obtained by simply changing the delay times of the delay circuits appropriately with employment of a sampling frequency at which vertical sampling positions on the screen are matched in timing.

Figure 7:
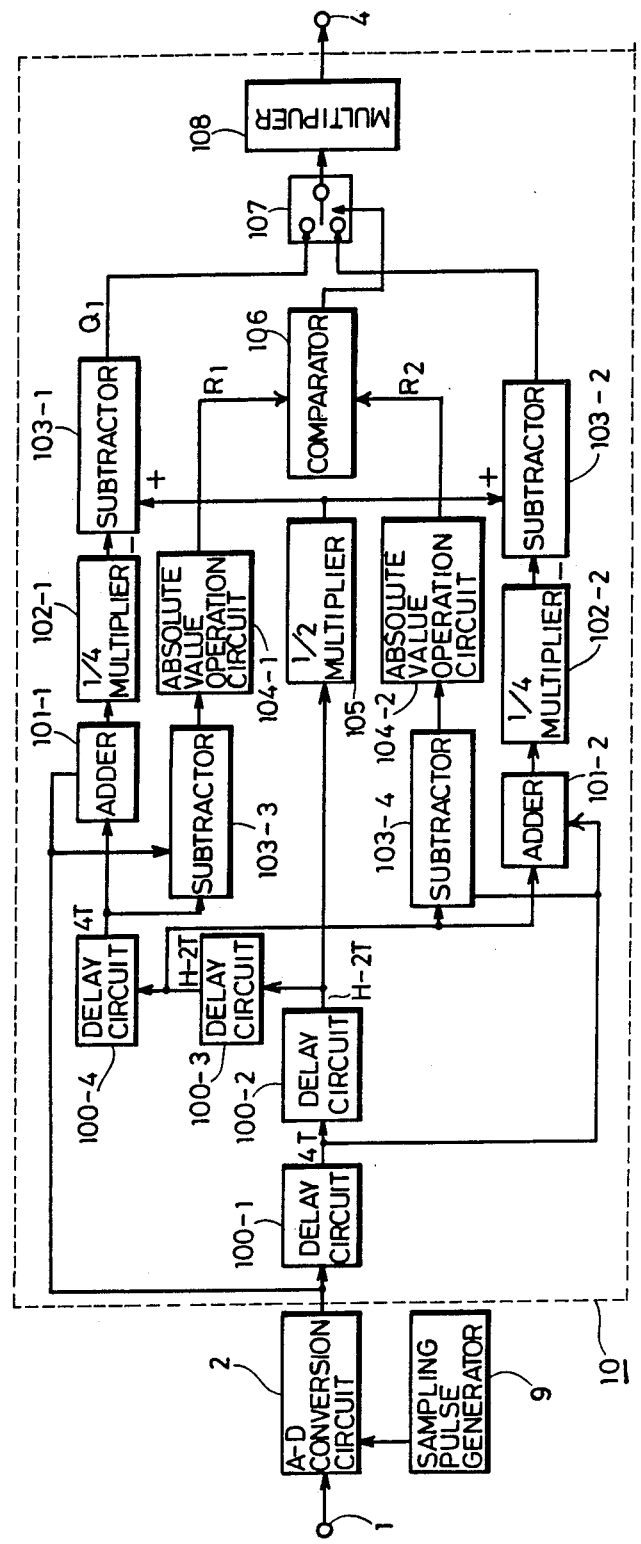
FIGS. 7 to 9 are block diagrams showing structure of contour detecting filters according to other embodiments of the present invention.

FIG. 7 is a block diagram showing structure of a contour signal detecting filter according to another embodiment of the present invention.

A contour signal detecting filter 10 as shown in FIG. 7 is provided as external circuits with an A-D conversion circuit 2 which converts analog composite video signals received in an input terminal 1 and a sampling pulse generator 9 which supplies timing signals for A-D conversion (sampling) in the A-D conversion circuit 2.

The pulse signals generated by the sampling pulse generator 9 have a frequency $f_s$ four times the frequency $f_{sc}$ of the chrominance subcarriers included in the analog composite video signals and are synchronized with the chrominance subcarriers. Therefore, the analog composite video signals are provided in signal series sampled per period T, i.e., the reciprocal of the sampling pulse frequency $f_s$.

The contour signal detecting filter 10 for detecting contour signals from the sampled composite video signals is roughly divided into a delay system, first and second arithmetic systems and a signal output system.

The delay system is formed by a 4T delay circuit 100-1 for delaying the composite video signals sampled in the A-D conversion circuit 2 by a period four times the sampling period T and outputting the same, an (H−2T) delay circuit 100-2 for delaying the signals from the 4T delay circuit 100-1 by a period obtained by subtracting the time twice the sampling period T from one horizontal scanning interval H and outputting the same, an (H−2T) delay circuit 100-3 for delaying the signals received from the (H−2T) delay circuit 100-2 by the period (H−2T) and outputting the same and a 4T delay circuit 100-4 for delaying the signals received from the (H−2T) delay circuit 100-3 by the period 4T and outputting the same to an adder 101-1 and a subtractor 103-3.

The first arithmetic system is divided into two further systems. One of the systems is formed by the adder 101-1 which receives the signals from the 4T delay circuit 100-4 and the A-D conversion circuit 2 to add up the same and output the result, a ¼ multiplier 102-1 which multiplies the signals from the adder 101-1 by ¼ to output the same and a subtractor 103-1 which receives signals from a ½ multiplier 105 for multiplying signals from the (H−2T) delay circuit 100-2 by ½ to output the same and signals from the 1/4 multiplier 102-1 to subtract the signals of the ¼ multiplier 102-1 from the signal sampling values of the ½ multiplier 105. The other arithmetic system is formed by the subtractor 103-3 which receives the signals from the A-D conversion circuit 2 and the 4T delay circuit 100-4 to perform subtraction, the direction of which may be arbitrarily selected, and an absolute value operation circuit 104-1 which receives the signals from the subtractor 103-3 to operate the absolute value of the same.

The second arithmetic system is also divided into two systems. One of the systems is formed by a subtractor 103-4 which receives the signals from the 4T delay circuit 100-1 and (H−2T) delay circuit 100-2 to obtain the difference between the signal values (the direction of the subtraction may be arbitrarily selected) and an absolute value operation circuit 104-2 which receives the signals from the subtractor 103-4 to operate the absolute value thereof. The other system is formed by an adder 101-2 which receives the signals from the 4T delay circuit 100-1 and (H−2T) delay circuit 100-3 to add up the same, a ¼ multiplier 102-2 which receives the signals from the adder 101-2 to multiply the same by ¼ and a subtractor 103-2 which receives the signals from the ½ multiplier circuit 105 for multiplying the signals from the (H−2T) delay circuit 100-2 by ½ and those from the ¼ multiplier 102-2 to subtract the signals of the ¼ multiplier 102-2 from those of the ½ multiplier 105.

The output system is formed by a comparator 106 which receives the signals from the absolute value operation circuits 104-1 and 104-2 to compare the same, a switch circuit 107 which selects and passes either the signals from the subtractor 103-1 or those from the subtractor 103-2 and a multiplier 108 which multiplies the signals received from the switch circuit 107 by N to supply the same to the output terminal 4. The multiplier factor N in the multiplier 108 is controlled by, e.g., a microcomputer (not shown) to perform contour correction adjustment.

Description is now made on the operation for contour detection of the sampling point P5 by the contour signal detecting filter 10, with reference to FIGS. 6 and 7.

It is assumed here that the A-D conversion circuit 2 supplies the sampling value of the sampling point P9 to the contour detecting filter 10 at a time t. At this time, the 4T delay circuit 100-1 supplies the sampling value of the sampling point P7, which is ahead of the sampling point P9 by the period 4T (leftward by four sampling points in FIG. 6).

The (H−2T) delay circuit 100-2 supplies the sampling value of the sampling point P5 which is ahead of the sampling point P7 by the period (H−2T).

The (H−2T) delay circuit 100-3 similarly supplies the sampling value of the sampling point P3.

The 4T delay circuit 100-4 supplies the sampling value of the sampling point P1.

The respective output sampling values from the aforementioned delay system are divided into four systems to be subjected to arithmetic processing, and the four systems are hereafter described respectively in order. First, description is made on the system formed by the adder 101-1, ¼-multiplier 102-1 and subtractor 103-1. The adder 101-1 adds up the sampling value of the sampling point P9 supplied by the A-D conversion circuit 2 and the sampling value of the sampling point P1 supplied by the 4T delay circuit 100-4, and hence it outputs (sampling value of sampling point P1)+(sampling value of sampling point P9).

The ¼ multiplier 102-1 multiplies its input sampling value by ¼ to output the same, and hence the ¼ multiplier 102-1 outputs ¼ {(sampling value of sampling point P1)+(sampling value of sampling point P9)}.

The subtractor 103-1 is adapted to subtract the sampling value supplied by the ¼ multiplier 102-1 from that supplied by the ½ multiplier 105. The ½ multiplier 105 multiplies the sampling value supplied by the (H−2T) delay circuit 100-2 by ½ to output the same, and hence it outputs the sampling value of the sampling point P5. Therefore, the output Q1 supplied by the subtractor 103-1 is:

$Q_1$=½(sampling value of sampling point P5)−¼{(sampling value of sampling point P1)+(sampling value of sampling point P9)}

This output $Q_1$ from the subtractor 103-1 is supplied to one terminal of the switch circuit 107.

Description is now made on the system formed by the adder 101-2, ¼ multiplier 102-2 and suttractor 103-2. The adder 101-2 adds up the output sampling values received from the 4T delay circuit 100-1 and (H−2T) delay circuit 100-3 to output the result, and hence it outputs (sampling value of sampling point P7)+(sampling value of sampling point P3).

The ¼ multiplier 102-2 multiplies its input signals by ¼ to output the same, and hence it outputs ¼{(sampling value of sampling point P7)+(sampling value of sampling point P3)}. The subtractor 103-2 is adapted to subtract the signals supplied by the ¼ multiplier 102-2 from those supplied by the ½ multiplier 105. The ½ multiplier 105 outputs ½(sampling value of sampling point P5) at this time. Therefore, the output signal $Q_2$ supplied by the subtractor 103-2 is:

$Q_2$=½(sampling value of sampling point P5)−¼{(sampling value of sampling point P7)+(sampling value of sampling point P3)}

This output $Q_2$ from the subtractor 103-2 is supplied to the other terminal of the switch circuit 107.

Consideration is now made as to the system formed by the subtractor 103-3 and the absolute value operation circuit 104-1. The subtractor 103-3 is adapted to find the difference between the sampling values from the 4T delay circuit 100-4 and the signals from the A-D conversion circuit 2 while the absolute value operation circuit 104-1 receives the sampling values from the subtractor 103-3 to operate the absolute value, and hence the sampling value $R_1$ supplied by the absolute value operation circuit 104-1 is:

$R_1$=|(sampling value of sampling point P1)−(sampling value of sampling point P9)|

Consideration is now made as to the last one of the arithmetic systems, which is formed by the subtractor 103-4 and the absolute value operation circuit 104-2. The subtractor 103-4 finds the difference between the signals from the 4T delay circuit 100-1 and those from the (H−2T) delay circuit 100-3 while the absolute value operation circuit 104-2 receives the signals from the subtractor 103-4 to operate the absolute value, and hence the signal $R_2$ supplied by the absolute value operation circuit 104-2 is:

$R_2$=|(sampling value of sampling point P3)−(sampling value of sampling point P7)|

The comparator 106 receives the signals $R_1$ and $R_2$ from the absolute value operation circuits 104-1 and 104-2 to compare the same thereby to control the switching circuit 107 in response to the result of the comparison in the following manner: When $R_1 > R_2$, the switch circuit 107 passes the signal $Q_1$ from the subtractor 103-1, and when $R_1 \leq R_2$, the switch circuit 107 passes the signal $Q_2$ from the subtractor 103-2. The outputs from the switch circuit 107 are supplied to a multiplier 108, which in turn multiplies its input signals by N to output the same for contour correction adjustment. The multiplier factor N is controlled by, e.g., a microcomputer (not shown) provided in the exterior in order to obtain a desired contour correction.

The signals $Q_1$ and $Q_2$ from the subtractors 103-1 and 103-2 respectively represent the second order differentiations in the sampling points having the same-phased oblique chrominance subcarriers on the screen. Therefore, assuming that the reference region is so small that the chrominance signals are not substantially changed, the signals $Q_1$ and $Q_2$ ultimately perform quadratic differentials of luminance signals with chrominance signal components eliminated since employed are the sampling points having the same chrominance subcarriers. Further, detected are larger changes of the signals to perform the second order differentiations along the direction of the larger signal changes, and hence the horizontal, vertical and oblique contour signals are simultaneously detected.

In order to perform Y/C separation by the aforementioned contour signal detecting filter 10, signals having appropriate delay times may be detected from the delay circuits by utilizing, e.g., taps.

Although the ¼ and ½ multipliers are employed in the aforementioned embodiment, the coefficients ¼ and ½ may be replaced by combinations of other coefficients which satisfy the relation of 1:2.

Further, although the sampling operation is performed at the frequency four times the chrominance subcarrier frequency in the aforementioned embodiment, an effect similar to the above can be obtained by appropriately changing the delay times of the delay circuits with a sampling frequency at which sampling points are vertically aligned on the screen.

Figure 8:
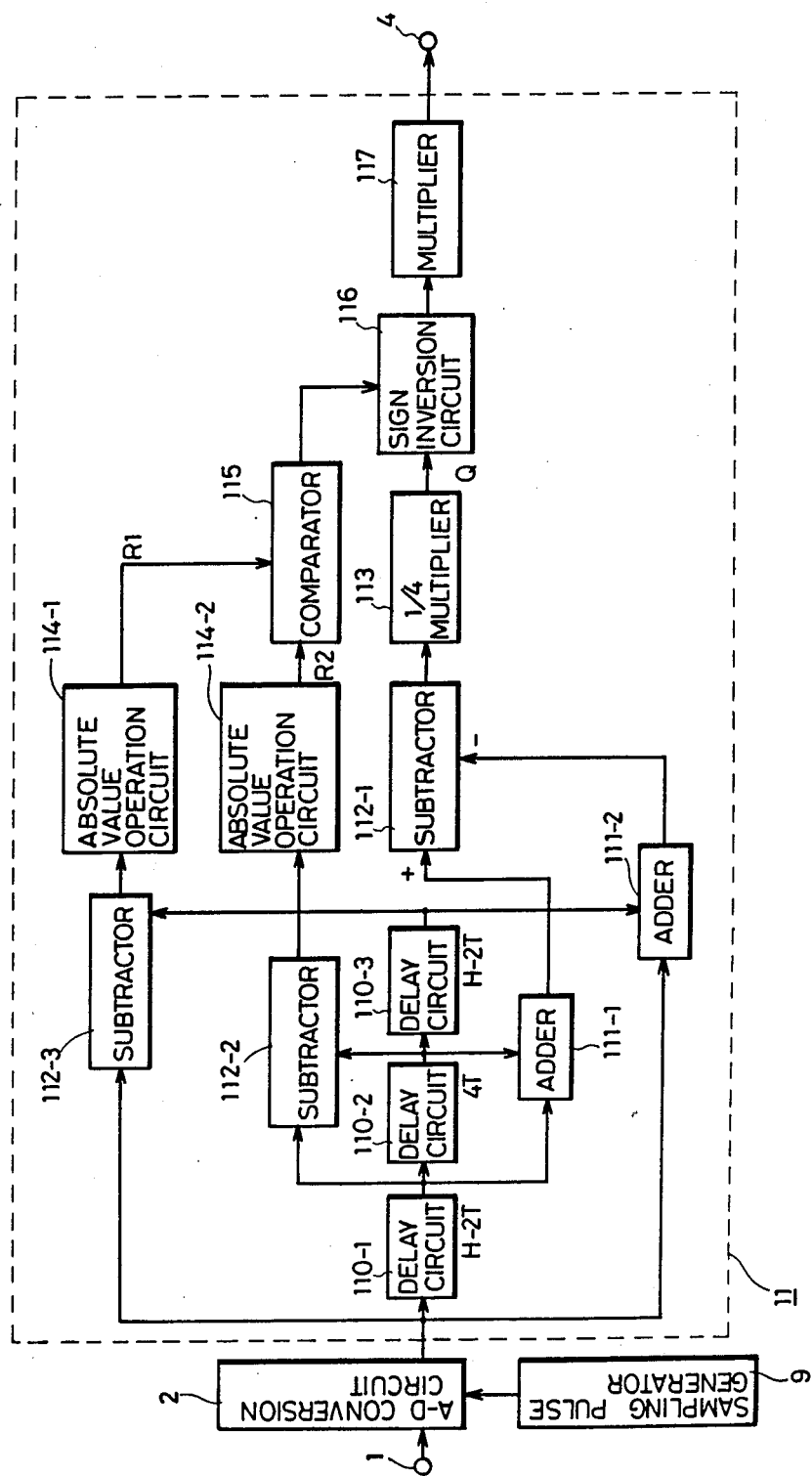

FIG. 8 is a block diagram showing structure of a contour signal detecting filter according to still another embodiment of the present invention. Referring to FIG. 8, provided as external circuits of a contour signal detecting filter 11 are an A-D conversion circuit 2 for converting analog composite video signals supplied to an input terminal 1 into digital signals and a sampling pulse generator 9 for supplying timing signals for A-D conversion (sampling) in the A-D conversion circuit 2. The pulse signals generated from the sampling pulse generator 9 have a frequency $f_s$, four times the frequency $f_{sc}$ of the chrominance subcarriers included in the video signals, and are synchronized with the chrominance subcarriers. Therefore, the analog video signals are provided in signal series sampled by a period $T=1/f_s=\frac{1}{4}f_{sc}$. The contour signal detecting filter 11 is provided with a delay system formed by an (H−2T) delay circuit 110-1 which receives the composite video signals sampled by the A-D conversion circuit 2 to delay the same by a period obtained by subtracting a time twice the sampling period T from one horizontal scanning interval, a 4T delay circuit 110-2 which receives the signals from the (H−2T) delay circuit 110-1 to delay the same by a period four times the sampling period T and an (H−2T) delay circuit 110-3 which receives the signals from the 4T delay circuit 110-2 to delay the same by a period obtained by subtracting the time twice the sampling period T from one horizontal scanning interval, which are provided in cascade connection with each other.

The contour signal detecting filter 11 is further divided roughly into four systems including first, second and third arithmetic systems and an output system.

The first arithmetic system is formed by a subtractor 112-3 which receives the signals from the A-D conversion circuit 2 and the (H−2T) delay circuit 110-3 to find the difference between the signal sampling values (subtraction may be performed in either direction) and an absolute value operation circuit 114-1 which receives the signals from the subtractor 112-3 to operate the absolute value thereof. A signal $R_1$ from the absolute value operation circuit 114-1 is supplied to one terminal of a comparator 115.

The second arithmetic system is formed by a subtractor 112-2 which performs subtraction with respect to the signal sampling value supplied by the (H−2T) delay circuit 110-1 and the 4T delay circuit 110-2 (subtraction may be performed in either direction) and an absolute value operation circuit 114-2 which receives the signals from the subtractor 112-2 to operate the absolute value of the same. A signal $R_2$ from the absolute value operation circuit 114-2 is supplied to the other terminal of the comparator 115.

The third arithmetic system is formed by an adder 111-1 which receives signals from the (H−2T) delay circuit 110-1 and the 4T delay circuit 110-2 to add up the same, an adder 111-2 which receives the signals from the A-D conversion circuit 2 and the (H−2T) delay circuit 110-3 to add up the same, a subtractor 112-1 which subtracts the signals supplied by the adder 111-2 from those supplied by the adder 111-1 and a ¼ multiplier 113 which receives the signals from the subtractor 112-1 to multiply the same by ¼.

The output system is formed by a sign inversion circuit 116 which inverts the signs of the signals supplied by the ¼ multiplier 113 in response to the result of comparison made in the comparator 115 and a multiplier 117 which multiplies the signals received from the sign inversion circuit 116 by N to output the same. The sign inversion circuit 116 performs the following sign inverting operation: When the relation between the signal $R_1$ supplied by the absolute value operation circuit 114-1 and the signal $R_2$ supplied by the absolute value operation circuit 114-2 is $R_1 \leq R_2$, the sign inversion circuit 116 inverts the sign of the signal Q supplied by the ¼ multiplier 113 to output the same. The multiplier factor N in the multiplier 117 is controlled from the exterior by, e.g., a microcomputer (not shown) for contour correction adjustment so as to retain a constant contour correction effect. The operation of the contour detecting filter is now described with reference to FIGS. 6 and 8.

It is assumed here that contour detection is performed on the sampling point P5 and the A-D conversion circuit 2 outputs the sampling value of the sampling point P8 at a time t. The (H−2T) delay circuit 110-1 delays its input signals by the time (H−2T) to output the same, and hence it outputs the sampling value of the sampling point P6 at the time t.

The 4T delay circuit 110-2 delays its input signals by the time 4T to output the same, and hence it outputs the sampling value of the sampling point P4.

The (H−2T) delay circuit 110-3 delays its input signals by the time (H−2T) to output the same, and hence it outputs the sampling value of the sampling point P2.

The subtractor 112-3 performs subtraction with respect to the output sampling values of the A-D conversion circuit 2 and the (H−2T) delay circuit 110-3 while the absolute value operation circuit 114-1 is adapted to operate the absolute value of the signals from the subtractor 112-3, and hence an output signal $R_1$ from the absolute value operation circuit 114-1 is:

$R_1 = |$(sampling value of sampling point P8)−(sampling value of sampling point P2)$|$ This is expressive of the amount of vertical signal changes on the screen.

The subtractor 112-2 performs subtraction with respect to the signals from the (H−2T) delay circuit 110-1 and the 4T delay circuit 110-2 while the absolute value operation circuit 114-2 receives the signals from the subtractor 112-2 to operate the absolute value thereof, and hence a signal $R_2$ supplied by the absolute value operation circuit 114-2 is:

$R_2 = |$(sampling value of sampling point P6)−(sampling value of sampling point P4)$|$ This is expressive of the amount of horizontal signal changes on the screen. The adder 111-1 adds up the signals supplied by the (H−2T) delay circuit 110-1 and the 4T delay circuit 110-2, and hence the adder 111-1 supplies the signal (sampling value of sampling point P4)+(sampling value of sampling point P6)

The adder 111-2 adds up the signals supplied from the A-D conversion circuit 2 and the (H−2T) delay circuit 110-3, and hence it supplies the signal {(sampling value of sampling point P8)+(sampling value of sampling point P2)}

The subtractor 112-1 subtracts the signals supplied by the adder 111-2 from those supplied by the adder 111-1 while the ¼ multiplier 113 multiplies the signals supplied by the subtractor 112-1 by ¼ to output the same. Therefore, a signal Q supplied by the ¼ multiplier 113 is:

$Q = \frac{1}{4}\{$(sampling value of sampling point P4) +

(sampling value of sampling point P6)$\}$ −

$\frac{1}{4}\{$(sampling value of sampling point P2) +

(sampling value of sampling point P8)$\}$

This expression is transformed as follows:

$Q = \frac{1}{4}\{$ − (sampling value of sampling point P2) +

2(sampling value of sampling point P5) −

(sampling value of sampling point P8)$\}$ −

$\frac{1}{4}\{$ − (sampling value of sampling point P4) +

2(sampling value of sampling point P5) −

(sampling value of sampling point P6)$\}$

As obvious from FIG. 6, the first term in the right side of the above expression represents the vertical second order differentiation on the screen while the second term represents the horizontal second order differentiation on the screen.

When the luminance is changed only in the vertical direction and no color is changed in both of the vertical and horizontal directions on the screen, the first term of the above expression is the high frequency component of the composite video signal, i.e., the total of the contour signal component and the chrominance signal component and the second term is only the chrominance signal component (the sampling point has the chrominance subcarrier antiphased with respect to the noted sampling point P5). In this case, therefore, the chrominance signal component included in the first term is eliminated by the chrominance signal component included in the second term, whereby detected is the vertical quadratic differential component on the screen with respect to the luminance signal.

When the luminance is only horizontally changed on the screen and no color is changed in both of the vertical and horizontal directions on the screen, the first term in the right side of the above expression represents only the chrominance signal component while the second term represents the high frequency component of the composite video signal, i.e., the total of the contour signal component and the chrominance signal component. In this case, therefore, the chrominance signal component is eliminated by the first and second terms and detected is the signal whose sign of the horizontal contour component on the screen is inverted, similarly to the above described case. In case where the chrominance signal is changed in space, the chrominance signal components in the first and second terms in the right side of the above expression are not correctly matched to be eliminated. However, the degree of mixture of the chrominance signal component into the contour compensating component can be neglected in practice.

The sign inversion circuit 116 inverts the sign of the signal supplied only when the amount $R_2$ of the horizontal signal change on the screen is greater than or equal to the amount $R_1$ of the vertical signal change on the screen in response to the result of comparison of the signals $R_1$ and $R_2$ by the comparator 115 to output the same. Therefore, as obvious from the above description, the sign inversion circuit 116 supplies the contour signal along the direction of the larger signal change. The multiplier 117 receives the signal from the sign inversion circuit 116 to multiply the supplied signal by N for contour correction adjustment, thereby to supply the same to the output terminal 4.

Although the sampling frequency $f_s$ is four times the frequency $f_{sc}$ of the chrominance subcarriers included in the composite video signals in the above embodiment, an effect identical to the above can be obtained with a sampling frequency at which the sampling points are vertically aligned on the screen. However, the delay times of the delay circuits must be appropriately changed in this case.

In order to employ the aforementioned contour detecting filter commonly with a luminance/chrominance signal separation circuit, signals having appropriate periods may be detected from the delay circuits by utilizing, e.g., taps.

Figure 9:
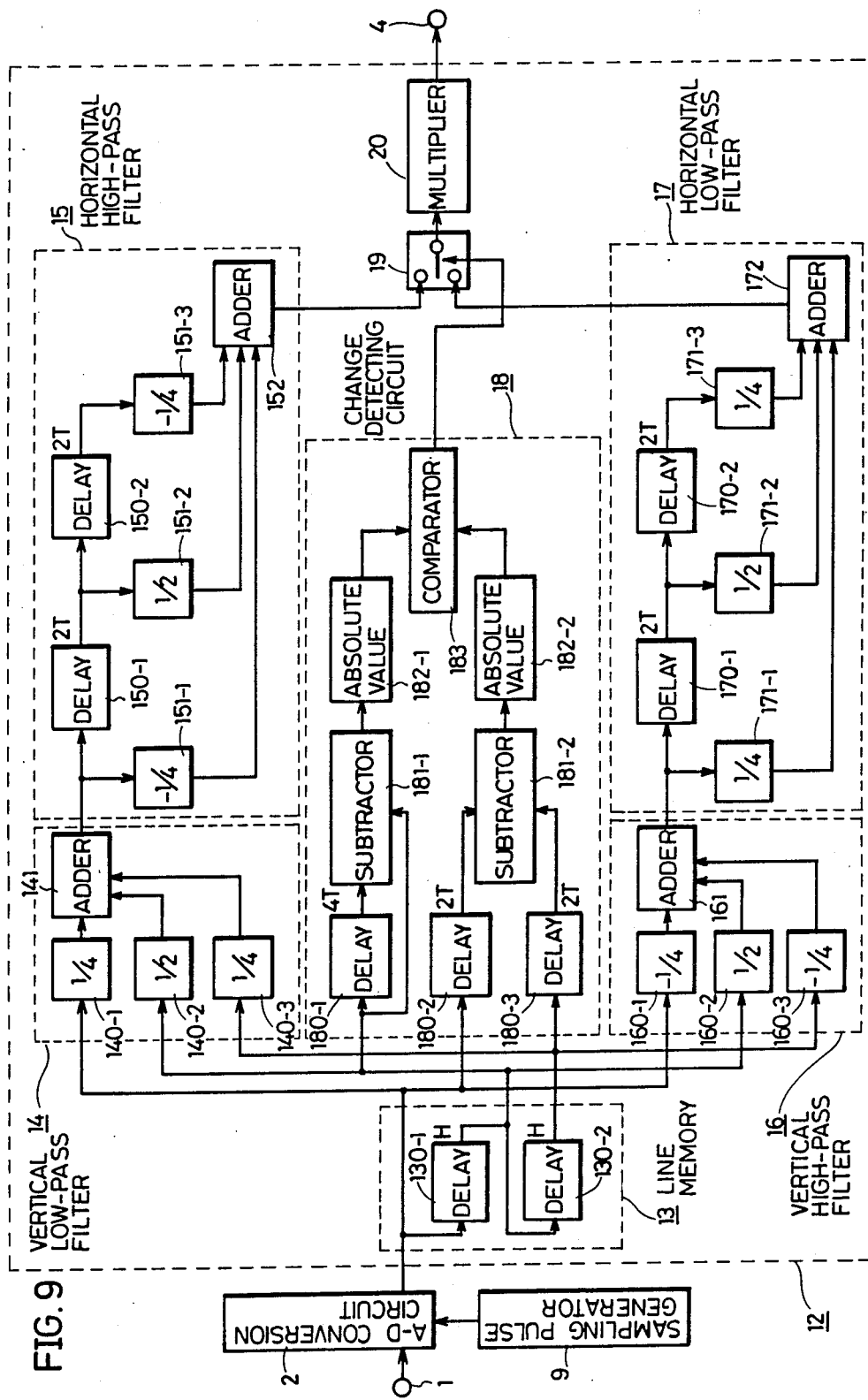

FIG. 9 is a block diagram showing structure of a further embodiment of the present invention. Referring to FIG. 9, a contour detecting filter comprises a line memory 13 which receives signals from an A-D conversion circuit 2 to delay the same by a predetermined period and output the same, a vertical low-pass filter 14 for receiving the signals from the line memory 13 to detect vertical low frequency components, a horizontal high-pass filter 15 for receiving the signals from the vertical low-pass filter 14 to detect horizontal high frequency components, a vertical high-pass filter 16 for receiving the signals from the line memory 13 to detect vertical high frequency components, a horizontal low-pass filter 17 for receiving the signals from the vertical high-pass filter 16 to detect horizontal low frequency components, a change detecting circuit 18 for receiving the signals from the line memory 13 to detect the direction in which pictorial images are changed, a switch circuit 19 which receives the signals from the horizontal high-pass and low-pass filters 15 and 17 to selectively output one of the signals in response to the signal from the change detecting circuit 18 and a multiplier 20 which receives the signal from the switch circuit 19 to multiply the same by a predetermined number and output the same thereby to retain the effect of contour correction.

The line memory 13 comprises delay circuits 130-1 and 130-2 for delaying supplied signals by one horizontal scanning interval H to output the same, and receives the signals from the A-D conversion circuit 2 to output three types of signals, i.e., non-delayed signals, signals delayed by 1H and signals delayed by 2H.

The vertical low-pass filter 14 is formed by a ¼ multiplier 140-1 which receives the non-delayed signals from the line memory 13 to multiply the same by ¼ and supply the same to an adder 141, a ½ multiplier 140-2 which receives the 1H delay signals from the line memory 13 through the delay circuit 130-1 to multiply the same by ½ and supply the same to the adder 141, and a ¼ multiplier 140-3 which receives the 2H delay signals from the line memory 13 through the delay circuit 130-2 to multiply the same by ¼ and supply the same to the adder 141, which in turn adds up the signals from the ¼ multipliers 140-1 and 140-3 and ½ multiplier 140-2 to supply the result to the horizontal high-pass filter 15.

The horizontal high-pass filter 15 is formed by a first delay circuit 150-1 which receives the signals from the vertical low-pass filter 14 to delay the same by a period 2T (i.e., twice the sampling period T) to supply the same to a ½ multiplier 151-2 and a second delay circuit 150-2, the second delay circuit 150-2 which delays the signals from the first delay circuit 150-1 further by the period 2T to supply the same to a −¼ multiplier 151-3, a −¼ multiplier 151-1 which receives the signals from the vertical low-pass filter 14 to multiply the same by −¼ to supply the same to an adder 152, a ½ multiplier 151-2 which receives the signals from the first delay circuit 150-1 to multiply the same by ½ and supply the same to the adder 152 and the −¼ multiplier 151-3 which receives the signals from the second delay circuit 150-2 to multiply the same by −¼ and supply the same to the adder 152, which in turn adds up the signals from the −¼ multipliers 151-1 and 151-3 and ½ multiplier 151-2 to supply the result to one input terminal of the switch circuit 19.

The vertical high-pass filter 16 is formed by a −¼ multiplier 160-1 which receives the non-delayed signals from the line memory 13 to multiply the same by −¼ and supply the same to an adder 161, a ½ multiplier 160-2 which receives the 1H delay signals from the line memory 13 (through the delay circuit 130-1) to multiply the same by ½ and supply the same to the adder 161 and a −¼ multiplier 160-3 which multiplies the 2H delay signals from the line memory 13 (through the delay circuit 130-2) by −¼ to supply the same to the adder 161, which in turn adds up the signals from the −¼ multipliers 160-1 and 160-3 and ½ multiplier 160-2 to supply the result to the horizontal low-pass filter 17.

The horizontal low-pass filter 17 is formed by a delay circuit 170-1 which receives the signals from the vertical high-pass filter 16 to delay the same by 2T and supply the same to a ½ multiplier 171-2 and a delay circuit 170-2, the delay circuit 170-2 which delays the signals from the delay circuit 170-1 further by 2T to supply the same to a ¼ multiplier 171-3, a ¼ multiplier 171-1 which receives the signals from the vertical high-pass filter 16 to multiply the same by ¼ and supply the same to an adder 172, the ½ multiplier 171-2 which multiplies the signals from the delay circuit 170-1 by ½ to supply the same to the adder 172, and the ¼ multiplier 171-3 which multiplies the signals from the delay circuit 170-2 by ¼ to supply the same to the adder 172, which in turn adds up the signals from the ¼ multipliers 171-1 and 171-3 and the ½ multiplier 171-2 to supply the result to the other input terminal of the switch circuit 19.

The change detecting circuit 18 has two arithmetic paths. One of the arithmetic paths is formed by a delay circuit 180-1 which receives the 1H delay signals from the line memory 13 to delay the same by 4T and supply the same to one input terminal of a subtractor 181-1, which in turn finds the difference between the signals from the delay circuit 180-1 and the 1H delay signals from the line memory 13 and supply the same to an absolute value operation circuit 182-1 and the absolute value operation circuit 182-1 which operates the absolute value of the signals from the subtractor 181-1 to supply the same to one input terminal of a comparator 183.

The other arithmetic path is formed by a 2T delay circuit 180-2 which receives the non-delayed signals from the line memory 13 to delay the same by 2T and supply the same to one input terminal of a subtractor 181-2, a delay circuit 180-3 which receives the 2H delay signals from the line memory 13 to delay the same by 2T and supply the same to the other input terminal of the subtractor 181-2, and the subtractor 181-2 which finds the difference between the signals from the delay circuits 180-2 and 180-3 to supply the same to an absolute value operation circuit 182-2, which in turn operates the absolute value of the signals from the subtractor 181-2 to supply the same to the other input terminal of the comparator 183. The comparator 183 compares the signals from the absolute value operation circuits 182-1 and 182-2 to supply signals in response to the result of the comparison to a control input terminal of the switch circuit 19.

The operation of this embodiment is now described in detail. Digital video signals received from the A-D conversion circuit 2 are divided into three systems by the line memory 13. The first system is signal value series f(nT) (T: sampling period, n: integer) outputted with no delay and the second system is formed by signal value series f(nT−H) (H: one horizontal scanning interval) in which f(nT) is delayed by one horizontal scanning interval through the 1H delay circuit 130-1 to be outputted while the third system is formed by signal value series f(nT−2H) in which f(nT−H) is delayed further by one horizontal scanning interval through the 1H delay circuit 130-2 to be outputted. These three signal value series f(nT), f(nT−H) and f(nT−2H) are vertically aligned in the said order from the bottom of the screen.

In the vertical low-pass filter 14, the first signal value series f(nT) is multiplied by ¼ through the coefficient multiplier 140-1 to be supplied to the first input terminal of the adder 141 and the second signal value series f(nT−H) is multiplied by ½ through the coefficient multiplier 140-2 to be supplied to the second input terminal of the adder 141 while the third signal value series f(nT−2H) is multiplied by ¼ through the coefficient multiplier 140-3 to be supplied to the third input terminal of the adder 141. The adder 141 adds up all of the aforementioned three system inputs, and hence the output g(nT−H) thereof is:

$$g(nT-H) = \tfrac{1}{4}[f(nT)+2f(nT-H)+f(nT-2H)]$$

or:

$$g(nT) = [\tfrac{1}{4} f(nT+H)+2f(nT)+f(nT-H)]$$

This is a well-known comb filter, the gain of which is 1 at f=mfH (f: frequency, m: integer, fH: horizontal scanning frequency) and 0 at f=(m+½)fH, and in view of a vertical frequency $f_{ver}$, this is a vertical low-pass filter whose gain is 1 at $f_{ver}=0$ and 1 at $f_{ver}=131.25$ (c/ph). Distributed around $f_{ver}=131.25$ (c/ph) are the chrominance signal components of the NTSC system, which are substantially eliminated by the aforementioned filter. Thus, the output g(nT) is obtained by detecting the vertical low frequency components of the luminance signals of f(nT) with no limitation to the horizontal frequency, and hence it includes the horizontal contour components.

The outputs from the adder 141 are supplied to the input terminals of the 2T delay circuit 150-1 and the $-\frac{1}{4}$ coefficient multiplier 151-1 through the horizontal high-pass filter 15. Assuming that the adder 141 outputs signal value series g(nT), the delay circuit 150-1 outputs signal value series g(nT−2T). The delay circuit 150-2 delays the signal value series further by 2T, and hence it outputs signal value series g(nT−4T). The coefficient multiplier 151-1 multiplies g(nT) by $-\frac{1}{4}$ to supply the same to the adder 152, and the coefficient multiplier 151-2 multiplies g(nT−2T) by $\frac{1}{2}$ to supply the same to the adder 152 while the coefficient multiplier 151-3 multiplies g(nT−4T) by $-\frac{1}{4}$ to supply the same to the adder 152, and then the adder 152 calculates the total of the said inputs, and hence the adder 152 outputs signal value series x(nT−2T) as follows:

$$x(nT-2T) = -\tfrac{1}{4}[g(nT)-2g(nT-2T)+g(nT-4T)]$$

or:

$$x(nT) = -\tfrac{1}{4}[g(nT+2T)-2g(nT)+g(nT-2T)]$$

This is a well-known horizontal high-pass filter, the gain of which is 0 at f=0 (Hz) and 1 at f=$f_{sc}$ ($f_{sc}$=chrominance subcarrier frequency). Thus, x(nT) represents the horizontal contour components, and this signal is inputted in one terminal of the switch circuit 19.

Description is now made on the operation for vertical contour detection. In the vertical high-pass filter 16, the output h(nT) from the adder 161 is, according to a discussion similar to the above, as follows:

$$h(nT) = -\tfrac{1}{4}[f(nT-H)-2f(nT)+f(nT+H)]$$

This is a comb filter, the gain of which is 0 at f=mfH and 1 at f=(m+$\tfrac{1}{2}$)fH, and in view of the vertical frequency, this is a vertical high-pass filter whose gain is 0 at $f_{ver}$=0 and 1 at $f_{ver}$=131.25 (c/ph). Thus, the signal value series h(nT) includes the vertical contour components as well as the chrominance signal components. These chrominance signal components are substantially eliminated by the horizontal low-pass filter formed by the delay circuits 170-1 and 170-2, coefficient multipliers 171-1 to 171-3 and adder 172, leaving the vertical contour components alone. In other words, the signal value series outputted from the adder 172 is, accordirg to a discussion similar to the above, as follows:

$$y(nT) = \tfrac{1}{4}[h(nT-2T)+h(nT)+h(nT+2T)]$$

This is a horizontal low-pass filter whose gain is 1 at f=0 (Hz) and 0 at f=$f_{sc}$, which eliminates the chrominance signal components included in the signal value series h(nT). The vertical contour components y(nT) are inputted in the other terminal of the switch circuit 19.

It is to be noted here that, in the embodiment, the horizontal and vertical contour signals detected in the aforementioned manner are not directly superposed to form horizontal/vertical contour signals, and either the horizontal contour signals or the vertical contour signals are suitably selected and outputted in response to the features of pictorial images. In definite terms, the features of the pictorial images reside in whether the contours are in the horizontal direction or vertical direction, which is detected by a circuit 18 for detecting changes in the contour direction. The first system f(nT) and the third system f(nT−2H) of the video signals are delayed by 2T respectively through delay circuits 180-2 and 180-3 to be supplied to the input terminal of a subtractor 181-2. Then the outputs of the subtractor 181-2 are supplied to an absolute value operation circuit 182-2, which operates the absolute value of the received signals. Thus, the output of the absolute value operation circuit 182-2 is as follows:

$$|f(nT-2T)-f(nT-2T-2H)|$$

Disregarding the delay time of 2T+H, this may be expressed as follows:

$$|f(nT+H)-f(nT-H)|$$

On the other hand, the second system f(nT−H) of the video signals is supplied to the input portion of a 4T delay circuit 180-1 and the first input portion of a subtractor 181-1, while the subtractor 181-1 receives in its second input portion signal value series f(nT−4T−H) delayed by 4T through the delay circuit 180-1. The output of the subtractor 181-1 is subjected to operation of the absolute value by an absolute value operation circuit 182-1, and hence the output of the absolute value operation circuit 182-1 is:

$$|f(nT-H)-f(nT-4T-2H)|$$

Disregarding the delay time of 2T+H, this can be expressed as follows:

$$|f(nT+2T)-f(nT-2T)|$$

When consideration is made with reference to f(nT) in the outputs from the absolute value operation circuit 182-2, f(nT+H) is the signal value series after one horizontal scanning interval, and is downwardly positioned by a single scanning line on the screen. f(nT−H) is the signal value series a single horizontal scanning interval forward, which is upwardly positioned by a single scanning line on the screen. The phases of the chrominance subcarriers are inverted per horizontal scanning line, and hence f(nT+H) is equal to f(nT−H) if no vertical change is caused on the pictorial images, whereby the absolute value operation circuit 182-2 outputs zero. In other words, the outputs of the absolute value operation circuit 182-2 indicate the degree of vertical changes in the pictorial images.

Considering the outputs of the absolute value operation circuit 182-1 with reference to f(nT) similarly to the above, f(nT+2T) is the signal value series two samples afterward, which is rightwardly positioned on the screen while f(nT−2T) is the signal value series two samples forward, which is leftwardly positioned on the screen. The sampling frequency is 4$f_{sc}$ and hence the phases of the subcarriers return to the same states every 4 sampling points if no horizontal change is caused in the pictorial images, whereby f(nT+2T) is equal to f(nT−2T) and the absolute value operation circuit 182-1 outputs zero. In other words, the outputs of the absolute value operation circuit 182-1 represent the degree of horizontal picture changes.

The comparator 183 compares the outputs from the above described two absolute value operation circuits 182-1 and 182-2 to control the switch circuit 19 so that the horizontal low-pass filter 17 outputs the vertical contour signals when the vertical signal difference is greater than the horizontal signal difference, while the horizontal high-pass filter 15 outputs the horizontal contour signals when the horizontal signal difference is greater than the vertical signal difference.

By virtue of the aforementioned output control, the chrominance signal components leaking to some extent into the horizontal or vertical contour signals can be further eliminated for the following reasons: The chrominance signal components leaking into the horizontal contour signals occupy regions in which the vertical frequency is relatively high and the horizontal frequency is approximate to $f_{sc}$. However, when the horizontal frequency approaches to $f_{sc}$, the horizontal difference of signals substantially approximates to zero. Then selected is the output of the filter for detecting the vertical contours with respect to the signal having the aforementioned frequency component, and the horizontal components are not outputted as the contour signal. Further, the chrominance signal components leaking into the vertical contour signals occupy regions in which the horizontal frequency is relatively high and the vertical frequency is approximately 131.25 (c/ph). However, as the vertical frequency approaches to 131.25 (c/ph), the vertical signal difference approximates to zero, whereby selected is the filter for detecting the horizontal contours and the vertical components are not outputted as the contour signal. Thus, the output switching control operation enables complete elimination of the chrominance signal components which cannot be completely eliminated by the filters for detecting the horizontal and the vertical contours.

Thus, according to the present invention, the horizontal and vertical contour signals are directly detected from the video signals, and hence the Y/C separation circuit for separating luminance signals and chrominance signals from the video signals can be commonly used with the delay circuits. Further, the horizontal and the vertical contour detecting filters are switched in response to the features of the pictorial images, whereby obtained are contour signals with reduced leakage of chrominance signal components.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A contour detecting filter (8, 10, 11) for detecting contour signals from composite video signals having luminance signals and chrominance signals frequency-multiplexed and including chrominance subcarriers by inputting series of sampling values obtained by sampling said composite video signals in the direction of horizontal scanning lines and the vertical direction in a time-series manner which are to be arranged in the form of a lattice, said contour detecting filter comprising:

a detector (80-1~80-4, 100-1~100-4, 110-1~110-3) for sequentially inputting one sampling value at a time from said series of sampling values to process the same as a noted sampling value thereby to detect four sampling values positioned in a point-symmetrical manner around said noted sampling value and which have the same-phased chrominance subcarriers; and an arithmetic unit (81, 82, 101-2, 102-2, 103-2, 105; 101-1 102-1, 103-1, 111-2, 111-1, 112-1, 113) for receiving said noted sampling value and said four sampling values obtained from said detector to perform arithmetic on second order differentiations of said sampling values in said direction of said horizontal scanning lines and said vertical direction.

2. A contour detecting filter in accordance with claim 1, wherein said composite video signals are sampled at a frequency equal to an integer multiple of said chrominance subcarriers.

3. A contour detecting filter in accordance with claim 2, wherein sampling values aligned in said vertical direction include alternately antiphased chrominance subcarriers.

4. A contour detectng filter in accordance with claim 1, further including a multiplier (83, 108, 117) for multiplying the output of said arithmetic unit by a predetermined real number thereby to perform contour correction.

5. A contour detecting filter in accordance with claim 2, wherein, assuming that a sampling point in the horizontal scanning direction is indicated by i, a line number of horizontal scanning is indicated by j and a sampling value positioned on a lattice point (i, j) is indicated by S(i, j), said detector detects (80-1~80-4, 100-1~100-4, 110-1~110-3) four sampling values S(i−2, j−1), S(i+2, j−1), S(i−2, j+1) and S(i+2, j+1) with reference to said noted sampling value S(i, j).

6. A contour detecting filter in accordance with claim 5, wherein said detector comprises a first delay circuit (80-1, 100-1) for delaying its input sampling value by a period (4T) four times a sampling period T, a second delay circuit (80-2, 100-2) for delaying the output from said first delay circuit by a period (H−2T) obtained by subtracting a period (2T) twice said sampling period T from one horizontal scanning interval H, a third delay circuit (80-3, 100-3) for delaying the output from said second delay circuit by said period (H−2T) and a fourth delay circuit (80-4, 100-4) for delaying the output from said third delay circuit by said period (4T), said input in said first delay circuit being S(i−2, j−1), said output from said first delay circuit being S(i+2, j−1), said output from said second delay circuit being S(i, j), said output from said third delay circuit being S(i−2, j+1) and said output from said fourth delay circuit being S(i+2, j+1).

7. A contour detecting filter in accordance with claim 6, wherein said arithmetic unit (81, 82, 101-1, 102-1, 103-1, 101-2, 102-2, 103-2) performs arithmetic on S(i−2, j−1)+S(i+2, j−1)+S(i−2, j+1)+S(i+2, j+1)−4·S(i, j) to output the result.

8. A contour detecting filter in accordance with claim 7, wherein said arithmetic unit (81, 82) comprises an adder (82) for adding up a value obtained by multiplying said output from said second delay circuit by −4, said input and output of said first delay circuit and said outputs of said third and fourth delay circuits to output the result.

9. A contour detecting filter in accordance with claim 6, wherein said arithmetic unit (101-1~103-1, 101-2~103-1, 106) performs arithmetic on ½ S(i, j)−¼{S(i−2, j−1)+S(i+2, j+1)} when an absolute value |S(i−2, j−1)−S(i+2, j+1)| is greater than an absolute value |S(i+2, j−1)−S(i−2, j+1)| while performing arithmetic on ½·S(i, j)−¼·{S(i+2, j−1)+S(i−2, j+1)} when said absolute value |S(i−2, j−1)−S(i+2, j+1)| is less than or equal to said absolute value |S(i+2, j−1)−S(i−2, j+1)|.

10. A contour detecting filter in accordance with claim 9, wherein said arithmetic unit comprises:

a first operation circuit (101-1, 102-1, 103-1, 105) for subtracting a value obtained by adding up said outputs of said first and fourth delay circuits (100-1, 100-4) and multiplying the result by ¼ from a value obtained by multiplying said output of said second delay circuit by ½, a second operation circuit (101-2, 102-2, 103-2, 105) for subtracting a value obtained by adding up said outputs of said first and third delay circuits and multiplying the result by ¼ from a value obtained by multiplying said output of said second delay circuit by ½, a third operation circuit (103-3, 104-1) for performing subtraction on said input of said first delay circuit and said output of said fourth delay circuit to obtain the absolute value thereof, a fourth operation circuit (103-4, 104-2) for performing subtraction on said outputs of said first and third delay circuits to obtain the absolute value thereof, and an output circuit (106, 107) for selecting the output of said first operation circuit when the output of said third operation circuit is greater than that of said fourth operation circuit while selecting the output of said second operation circuit when said output of said fourth operation circuit is greater than said output of said third operation circuit.

11. A contour detecting filter in accordance with claim 2, wherein said chrominance subcarriers included in said four sampling values obtained from said detector are antiphased to said chrominance subcarrier included in said noted sampling value.

12. A contour detecting filter in accordance with claim 11, wherein, assuming that a sampling point in the direction of horizontal scanning is indicated by i, a line number of horizontal scanning is indicated by j and a sampling value positioned on a lattice point (i, j) is indicated by S(i, j), said detector detects four sampling values S(i, j−1), S(i−2, j), S(i+2, j) and S(i, j+1) with respect to said noted sampling value S(i, j).

13. A contour detecting filter in accordance with claim 12, wherein said detector comprises a first delay circuit (110-1) for delaying its input sampling value by a period (H−2T) obtained by subtracting a period (2T) twice the sampling period T from one horizontal scanning interval H, a second delay circuit (110-2) for delaying the output of said first delay circuit by a period (4T) four times the sampling period T and a third delay circuit (110-3) for delaying the output of said second delay circuit by said period (H−2T), said input in said first delay circuit being S(i, j−1), said output of said delay circuit being S(i−2, j), said output of said second delay circuit being S(i+2, j) and said output of said third delay circuit being S(i, j+1).

14. A contour detecting filter in accordance with claim 13, wherein said arithmetic unit performs arithmetic on ¼·{S(i−2, j)+S(i+2, j)−S(i, j−1)−S(i, j+1)} when an absolute value |S(i, j−1)−S(i, j+1)| is greater than an absolute value |S(i−2, j)−S(i+2, j)| while performing arithmetic on −¼·{S(i−2, j)+S(i+2, j)−S(i, j−1)−S(i, j+1)} when said absolute value |S(i, j−1)−S(i, j+1)| is less than or equal to said absolute value |S(i−2, j)−S(i+2, j)|.

15. A contour detecting filter in accordance with claim 14, wherein said arithmetic unit comprises:

a first operation circuit (112-3, 114-1) for performing subtraction on said input of said first delay circuit (110-1) and said output of said third delay circuit (110-3) to operate the absolute value, a second operation circuit (111-2, 114-2) for performing subtraction on said outputs of said first and second (110-2) delay circuits to operate the absolute value, a third operation circuit (111-1, 111-2, 112-1) for subtracting a value obtained by adding up said input of said first delay circuit and said output of said third delay circuit from a value obtained by adding up said outputs of said first and second delay circuits, and an output circuit (115, 116) for selecting said output of said third operation circuit when said output of said first operation circuit is greater than said output of said second operation circuit while inverting and selecting said output of said third circuit when said output of said second operation circuit is greater than said output of said first operation circuit.

16. A contour detecting filter for detecting contour signals from composite video signals having luminance signals and chrominance signals frequency-multiplexed and including chrominance subcarriers by inputting series of sampling values obtained by sampling said composite video signals in a series manner in the direction of horizontal scanning lines thereof and the vertical direction to be arranged in the form of a lattice, said contour detecting filter comprising:

a line memory (13) sequentially detecting three sampling values having a period of one horizontal scanning interval from said series of sampling values;

a vertical low-pass filter (14) receiving said three sampling values obtained from said line memory for detecting low-frequency components in said vertical direction;

a horizontal high-pass filter (15) cascade-connected to said vertical low-pass filter for detecting high frequency components in said direction of said horizontal scanning lines;

a vertical high-pass filter (16) receiving said three sampling values obtained from said line memory for detecting high frequency components in said vertical direction;

a horizontal low-pass filter (17) cascade-connected to said vertical high-pass filter for detecting low frequency components in said direction of horizontal scanning lines;

a change detecting circuit (18) receiving said three sampling values obtained from said line memory for performing arithmetic on the amounts of changes of said sampling values in said direction of horizontal scanning lines and said vertical direction thereby to detect the direction having the larger amount of sampling value changes; and an output circuit (19) for selecting the output of said horizontal high-pass filter when said change detecting circuit indicates said direction of horizontal scanning lines while selecting the output of said horizontal low-pass filter when said change detecting circuit indicates said vertical direction.

17. A contour detecting filter in accordance with claim 16, wherein sampling values aligned in said vertical direction include chrominance subcarriers alternately antiphased to each other.

18. A contour detecting filter in accordance with claim 17, wherein said composite video signals are sampled at a frequency equal to 4 times that of the chrominance subcarriers.

19. A contour detecting filter in accordance with claim 18, wherein said line memory comprises a first delay circuit (130-1) for delaying input sampling values by one horizontal scanning interval (H) and a second delay circuit (130-2) for delaying the output of said first delay circuit by said period (H), to detect the input and the output of said first delay circuit and the output of said second circuit as three sampling values respectively having said period of said one horizontal scanning interval.

20. A contour detecting filter in accordance with claim 19, wherein said vertical low-pass filter (14) comprises a first adder (141) for adding up a value obtained by multiplying said input of said first delay circuit by (130-1) ¼, a value obtained by multiplying said output of said first delay circuit (130-1) by ½ and a value obtained by multiplying said output of said second delay circuit (130-2) by ¼ to output the result.

21. A contour detecting filter in accordance with claim 20, wherein said horizontal high-pass filter (15) comprises a third delay circuit (150-1) for delaying the output of said vertical low-pass filter by a period (2T) twice said sampling period T, a fourth delay circuit (150-2) for delaying the output of said third delay circuit by said period (2T) and a second adder (153) for adding up a value obtained by multiplying said input of said third delay circuit by −¼, a value obtained by multiplying said output of said third delay circuit by ½ and a value obtained by multiplying the output of said fourth delay circuit by −¼ to output the result.

22. A contour detecting filter in accordance with claim 19, wherein said vertical high-pass filter (16) comprises a third adder (161) for adding up a value obtained by multiplying the input of said first delay circuit (130-1) by −¼, a value obtained by multiplying the output of said first delay circuit by ½ and a value obtained by multiplying the output of said second delay circuit (130-2) by −¼.

23. A contour detecting filter in accordance with claim 22, wherein said horizontal low-pass filter (17) comprises a fifth delay circuit (170-1) for delaying the output of said vertical high-pass filter (16) by a period (2T) twice the sampling period T, a sixth delay circuit (170-2) for delaying the output of said fifth delay circuit by said period (2T) and a fourth adder (172) for adding up a value obtained by multiplying the input of said fifth delay circuit by ¼, a value obtained by multiplying the output of said fifth delay circuit by ½ and a value obtained by multiplying the output of said sixth delay circuit by ¼ to output the result.

24. A contour detecting filter in accordance with claim 19, wherein said change detecting circuit (18) comprises a seventh delay circuit (180-1) for delaying the output of said first delay circuit by a period (4T) four times the sampling period T, an eighth delay circuit (180-3) for delaying the input of said first delay circuit by a period (2T) twice the sampling period T, a ninth delay circuit for delaying the output of said second delay circuit by said period (2T) and a comparator (183) for comparing the absolute value of difference between the input and the output of said seventh delay circuit with the absolute value of difference between the outputs of said eighth and ninth delay circuits.

* * * * *